US008086562B2

(12) United States Patent
Finger et al.

(10) Patent No.: US 8,086,562 B2
(45) Date of Patent: Dec. 27, 2011

(54) ARRANGEMENT FOR ANONYMOUS API DOWNLOADED RESOURCES FOR ADVANCED CONTENT

(75) Inventors: James C. Finger, Kirkland, WA (US); Peter J. Torr, Kirkland, WA (US); Andrew J. Clinick, Issaquah, WA (US); Jeffrey A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 12/165,616

(22) Filed: Jun. 30, 2008

(65) Prior Publication Data
US 2009/0327306 A1    Dec. 31, 2009

(51) Int. Cl.
*G06F 17/00* (2006.01)
(52) U.S. Cl. .......................................... 707/602; 707/913
(58) Field of Classification Search .................. 707/602, 707/913, 999.01
See application file for complete search history.

(56) References Cited

U.S. PATENT DOCUMENTS

| | | | |
|---|---|---|---|
| 6,347,398 B1 | 2/2002 | Parthasarathy et al. | |
| 6,807,550 B1 | 10/2004 | Li et al. | |
| 6,813,690 B1 * | 11/2004 | Lango et al. | 711/118 |
| 7,249,165 B1 * | 7/2007 | Lu et al. | 709/217 |
| 2002/0131404 A1 | 9/2002 | Mehta et al. | |
| 2003/0182567 A1 * | 9/2003 | Barton et al. | 713/193 |
| 2004/0024688 A1 | 2/2004 | Bi et al. | |
| 2006/0026182 A1 | 2/2006 | Takeda et al. | |
| 2006/0085517 A1 | 4/2006 | Kaurila | |
| 2006/0135179 A1 | 6/2006 | Aaltonen | |
| 2007/0162538 A1 | 7/2007 | Kim et al. | |
| 2007/0201502 A1 | 8/2007 | Abramson | |
| 2007/0204115 A1 | 8/2007 | Abramson | |
| 2008/0005178 A1 | 1/2008 | Annic | |

OTHER PUBLICATIONS

B. Callaghan, WebNFS Server Specification, Oct. 1996, Sun Microsystems.*
"Downloading Media Content", Microsoft Corporation, retrieved on Mar. 17, 2008 from http://msdn2.microsoft.com/en-us/library/bb248492(VS.85).aspx.
"What is GetWebPics ?", PhotoActions, retrieved on Mar. 17, 2008 from http://www.photoactions.com/gwp/.
"HIDownload", StreamingStar Technology Inc., retrieved on Mar. 17, 2008 from http://www.hidownload.com/.

* cited by examiner

*Primary Examiner* — Thu-Nguyet Le

(57) ABSTRACT

Provided are arrangements for downloading resources and managing downloaded resources. A file is requested from a HTTP server, the file associated with an original URI. The file is downloaded and assigned a handle. The file is then stored in a storage location such as a file cache or in a persistent storage location. Upon command of an advanced content playlist or sequence, the file is called by calling the handle of the file. The storing of the file may include storing the file in a location where the file is subject to an automatic removal operation. The file may be an image file or any other type of file, especially multimedia files. The automatic removal operation may occur upon a quitting or restarting of the application. If another request is made for another file, the prior downloaded file may be replaced.

20 Claims, 6 Drawing Sheets

*(INITIAL STATE)*

(STATE FOLLOWING SECOND DOWNLOAD)

ARRANGEMENT FOR ANONYMOUS API DOWNLOADED RESOURCES FOR ADVANCED CONTENT

BACKGROUND

The Internet comprises a vast number of computers interconnected so that information can be exchanged among the computers. Various protocol and other interface standards have been developed for the Internet so that each computer will understand information of the other computers. The World-Wide Web ("WWW") is a subset of the Internet computers that support the Hypertext Transfer Protocol ("HTTP"). HTTP is an application-level protocol for distributed, collaborative, hyper-media information systems that defines the format and contents of messages and responses sent between client programs ("clients") and server programs ("servers") over the Internet. In addition, HTTP is a generic, stateless, object-oriented protocol which can be used for many other tasks, such as name servers and distributed object management systems, through various extensions.

The Internet facilitates information exchange between servers and clients that are located throughout the world. Each computer on the Internet has a unique address (e.g., "acme.com"). When a client wishes to access a resource (e.g., document), the client specifies a Uniform Resource Identifier ("URI") that uniquely identifies the computer on which the server executes and the resource. Types of URIs include a Uniform Resource Locator ("URL") or and Uniform Resource Name ("URN"). An example of a URL is "http://acme.com/page1." In this example the server is identified by "acme.com" and the resource is identified by "page1."

The "http" at the beginning of the example URL is the scheme and indicates that the remainder of the URL should be interpreted according to HTTP. The remainder specifies a server computer (e.g., "acme.com") followed by additional information that is specific to the server. For example, the additional information may be a path name within the server computer to a Hypertext Markup Language ("HTML") document.

One type of computing device that may access URIs is an "Advanced Content" device. In general, advanced content media devices allow advanced content interactivity, especially for high-definition content, e.g., Silverlight or BD-J content. "Advanced Content" refers to an interactivity layer that was originally described by the DVD Forum for applicability to a next generation high definition DVD (digital versatile disc) format called "HD-DVD". Many features of Advanced Content are currently being implemented by Microsoft Corporation's HDi technology which enables advanced viewing features including enhanced content, interactive user experiences, navigation, and other functionality to be rendered in real-time as the AV content (such as a movie or other content) plays. HDi uses standards including XML (eXtensible Markup Language), HTML (Hypertext Markup Language), CSS (Cascading Style Sheets), SMIL (Synchronized Media Integration Language), and ECMAScript (also known as JavaScipt).

Advanced content, generally stored on advanced media, represents one or more sequences (generally, time-ordered) of video, audio, images, text, and/or graphics presentable to users as media content streams. More than one independently-controlled media content stream may be concurrently presented (for example, a main movie along with features such as a director's commentary, actor biographies, or advertising). The content may include interactive objects, where examples of interactive objects include, among other things, video samples or clips, audio samples or clips, images, graphics, text, and combinations thereof. These interactive objects may be under the control of a sophisticated software program, providing complex control of the interactivity. A sequence may generally also include the accessing of network resources such as images.

Two methods are generally employed for accessing network resources. A first is "scheduled downloading". Scheduled downloading requires the exact location of the resource to be known at the time that the sequence is created. However, scheduled downloading provides for automatic resource management, which is the deletion of resources after the same are no longer needed. A second method is "API downloading". In API downloading, the location of the resource may be specified at runtime, rather than at the time the sequence is created. However, API downloading does not provide any automated form of resource management. In other words, resources are not automatically or pro-actively deleted, since the system has no knowledge and makes no assumptions of how and for how long the resource will be used. This aspect may be particular constraining on space-limited computing devices, such as mobile phones.

SUMMARY

Arrangements are described which provide users with a downloading mechanism that both allows for the location to be specified dynamically, e.g., at runtime, and also allows a mechanism for automatically removing unused resources.

In one aspect, arrangements are provided for downloading resources and managing downloaded resources. Steps include, using a HTTP client, requesting a file from a HTTP server, the file associated with an original URI; downloading the file; assigning a handle to the file, the handle associated with the original URI of the file; storing the file in a storage location; and upon command of an advanced content playlist or sequence, calling the file by calling the handle of the file. The storing of the file may include storing the file in a location where the file is subject to an automatic removal operation.

Implementations of the arrangement may include one or more of the following. The file, which may be an image file or any other type of file, especially multimedia files, may be stored in a file cache or in a protected or persistent location. The removing may occur upon a quitting or restarting of the application. If another request is made for another file, the prior downloaded file may be replaced.

In another aspect, the arrangement may be directed to a set of application program interfaces that work in conjunction with an advanced content application program that downloads and manages files, where the files are associated with original URIs. A first interface is configured to send a request to a HTTP server for a file associated with an original URI; a second interface is configured to download the file and assign a handle to the file, the handle associated with the original URI. A third interface store the file in a storage location such as a file cache or in a persistent storage location. And a fourth interface calls the file from the storage location, in which the call is made using the handle associated with the original URI. A fifth interface may be employed to replace the file in the storage location upon the request and download of another file.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Corresponding reference characters indicate corresponding parts throughout the drawings.

DETAILED DESCRIPTION

FIGS. 1-6 illustrate how the arrangement may be employed to support the anonymous API downloaded resources for advanced content. Using the arrangement, a downloading mechanism is provided that both allows for the network location of a desired resource to be specified dynamically, e.g., at runtime, and also allows a mechanism for automatically removing unused resources.

Figure 1:
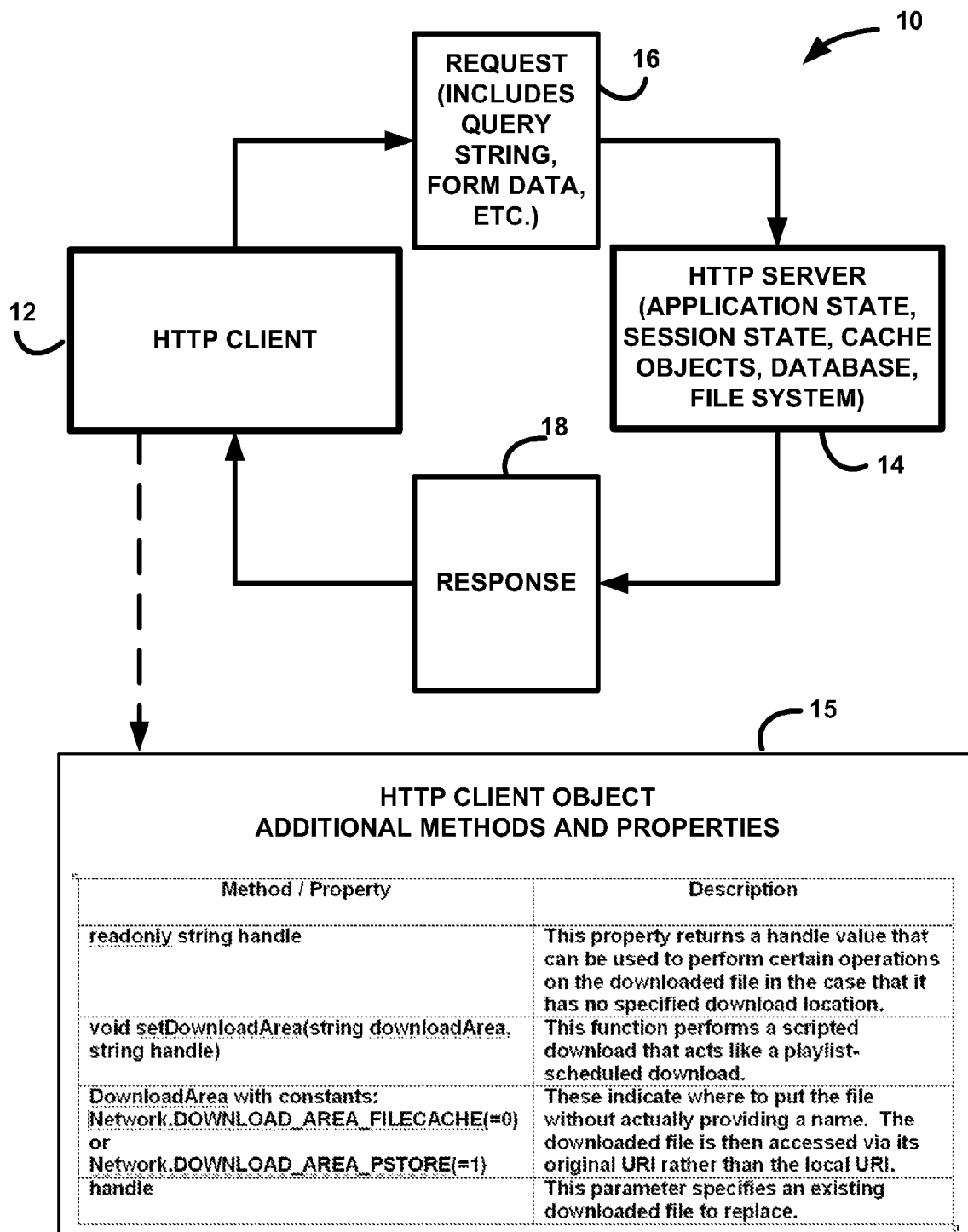
FIG. 1 is a logical diagram showing additional properties and methods of an HTTP client in communication with an exemplary HTTP server.

Referring to FIG. 1, an arrangement 10 is shown that includes an HTTP client 12 in communication with a server 14. An HTTP client is an object that gets XML data, images, and other content by communicating with an HTTP server. An HTTP client may be implemented in any number of languages, and may constitute, e.g., a web browser.

The HTTP client 12 sends a request 16 to the HTTP server 14, and the request may include query strings, form data, and various other requests, including requests for network resources. The HTTP server 14 in turn provides a response 18 to the request 16, and the response may include a requested network resource file or the like.

In the context of the arrangement, the HTTP client includes one or more additional properties and methods, as indicated in FIG. 1 by HTTP client object 15. These additional properties and methods facilitate retrieval of anonymous API downloaded resources, such as images or other resources, for advanced content. In some implementations, the additional properties and methods allow managed downloads on memory-constrained or space-limited devices, such as mobile phones, although the arrangement may be applicable to any computing device. The HTTP client object may provide a number of useful features in this regard. First, downloaded resources are made available by their original URIs, just as scheduled resources are. Next, resources are capable of being removed from memory when they are no longer needed.

The additional properties and methods include "readonly string handle", which is a property that returns a handle value that can be used to perform various operations on the downloaded file in the case that the file has no specified download location. This may be the case, e.g., where the setDownloadArea function was used. If this is not the case, e.g., where an explicit specification is made to a destination path and filename, then the property contains an empty string. The format of the string may vary. It is generally sufficient that the same be recognized by certain file input and output operations, such as "remove". The string may also be used by the markup engine as the basis for background images, sounds, and the like.

The string is equivalent to a filename as far as the markup engine is concerned. In prior efforts, for example, if a file "www.foo.com/file.png" was to be downloaded and displayed in the markup, it was downloaded from "www.foo.com/file.png" and explicitly given the download location as, e.g., "filecache:///file.png". In order to get the image in the markup, backgroundImage was set to "filecache:///file.png". The downside was that the file was generally not automatically removed later.

Within the context of the arrangement, the file may be downloaded from "www.foo.com/file.png" and, e.g., the setDownloadArea function may be employed to specify storage location, e.g., FILECACHE. In this case there is no explicit filename to use, but a handle is returned, e.g., "$ABCD1234". It is noted that the handle may be completely fanciful—the same is just a unique identifier that the system understands. The handle has no meaning to the application or the programmer.

In order to get the image in the markup, backgroundImage may be set to "$ABCD1234". The arrangement recognizes that the reference is to a handle that actually points to a downloaded resource (which may or may not have a real name in the filesystem).

An additional method that may be employed by the HTTP client is "void setDownloadArea(string downloadArea, string handle)". This function serves to perform a scripted download that acts like a playlist- or sequence-scheduled download. The actual location of the downloaded file may not be apparent to the application, such as an advanced content application running an advanced content sequence or playlist, but the application can call the resource using the handle. The downloadArea parameter may be employed to specify any logical storage location supported by the device, such as a short-term RAM disk or permanent storage. In one specific implementation, the logical storage location may be Network.DOWNLOAD_AREA_FILECACHE or Network.DOWNLOAD_AREA_PSTORE. This indicates where the file should be placed without actually giving the same a name. The resource may be deleted when the application quits, or when the application downloads a replacement resource.

As noted, the file may be accessed by its handle, and the handle corresponds to the resource's original URI, rather than a local URI. This correspondence may be made by way of a look-up table, for example.

For the use of FILECACHE and PSTORE, the resource file is automatically removed when the application quits or restarts. The file may also be removed if another file is downloaded which replaces the prior downloaded file. Various other APIs may also be employed to remove the resource, including COPY and REMOVE. In some implementations, the arrangement may cause files to be removed that are currently in-use. These files may be retrieved later, on-demand, if the same are subsequently used again. All of these are termed here "automatic removal operations". In this way, memory may be saved, which may be particularly important on a space-constrained device.

In any case, using the above methods and properties, the downloaded file may then be accessed using its handle. The downloaded file may also be accessed using the original URI (rather than a local URI), in much the same way that a resource managed by a playlist or sequence could be. The handle and the original URI are equivalent but serve different purposes. The original URI is useful in many certain cases, e.g., showing an image in markup. But for some scenarios, such as certain APIs, there may be an ambiguity between the actual remote location and the locally-copied file. In this case, the handle is used which unambiguously refers to the locally-copied file.

Certain additional parameters are now described. The "handle" parameter specifies an existing downloaded file to "replace". Thus, the handle parameter is the value retrieved from the handle property corresponding to the prior download. This parameter may be null or may be the empty string if no existing files need removal. However, the specified resource may be generally removed before a new resource is downloaded.

Figure 2:
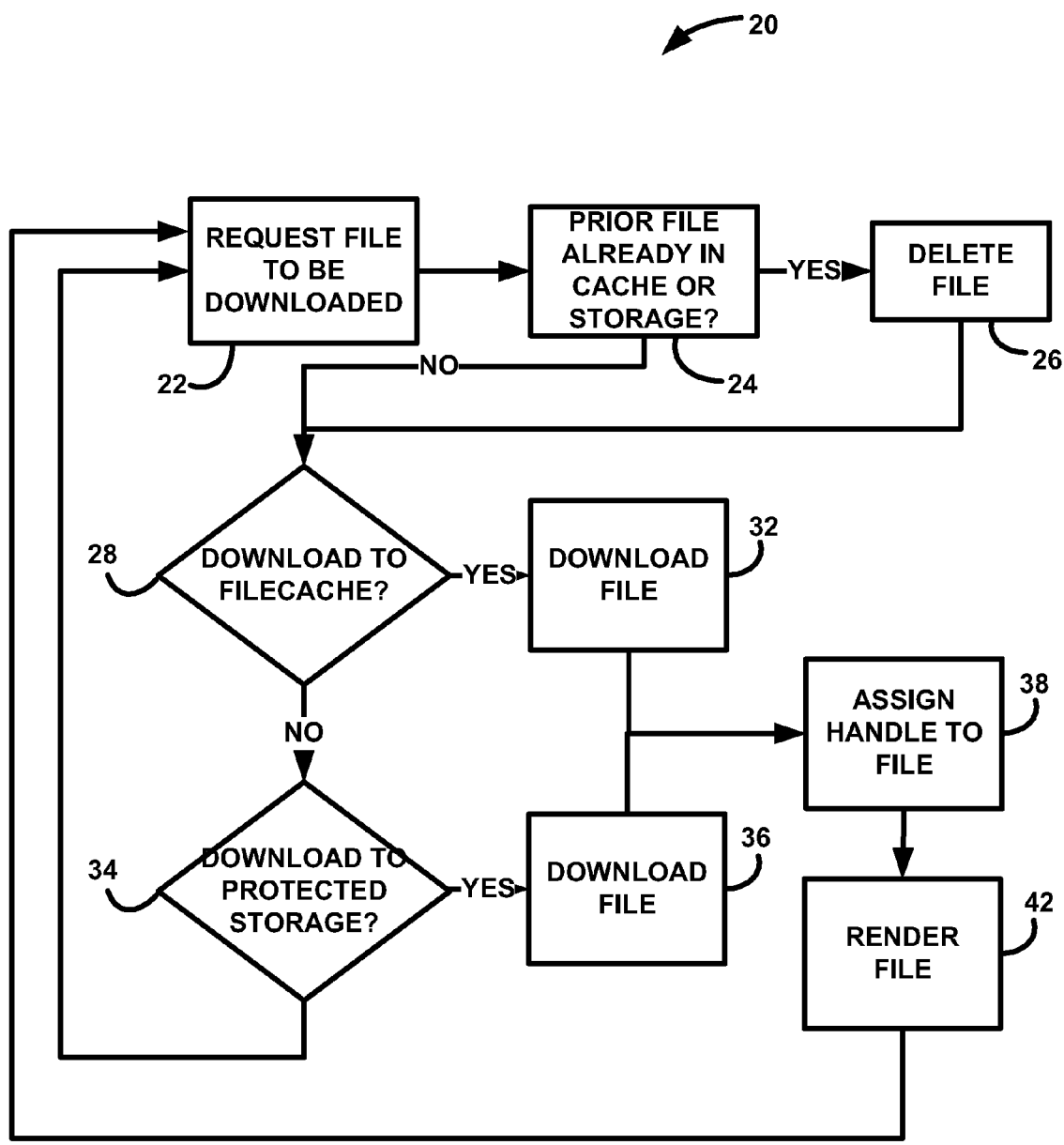
FIG. 2 is a flowchart for an arrangement for anonymous API downloaded resources for advanced content.

FIG. 2 illustrates a flowchart 20 of the arrangement. A first step is that a request be made for a resource or file (step 22) to be downloaded. For example, a playlist or sequence may call for the download of a file or such a request may be made at runtime. A check may be made if a prior-downloaded file is already in a file cache or already in a storage location (step 24). If so, the previously-stored file may be removed or deleted (step 26). If not, or after the removal or deletion, the flow may pass to a decision whether to download the file to a file cache (step 28) or to a persistent or protected storage (step 34). The figure shows these as sequential decisions but they may be taken in any order or alternatively combined. Each leads to a download of the file to the respective type of location (step 32 or step 36). It is noted though that any accessible storage location may be employed.

A handle is assigned to the file. As noted above, the handle value can be employed to perform certain operations on the downloaded file. For example, the handle may be used to specify an existing downloaded file to replace, and this parameter is the value retrieved from the handle property of the previous download. The parameter may be null or the empty string if no existing files need to be removed. If there are existing files, the same are removed before the new resource is downloaded.

The handle may have any value, just like a handle in Windows®. The handle may then be employed instead of a filename in operations such as displaying content through markup, file operations such as deleting or copying, replacing one resource with another, and so on. The markup engine recognizes the handle and locates the resource via any implementation-defined mechanism, e.g., a look-up table.

A next step may be to render or otherwise use the retrieved file (step 42). The process may then begin again at step 22 as dictated by the advanced content sequence or playlist.

Figure 3:
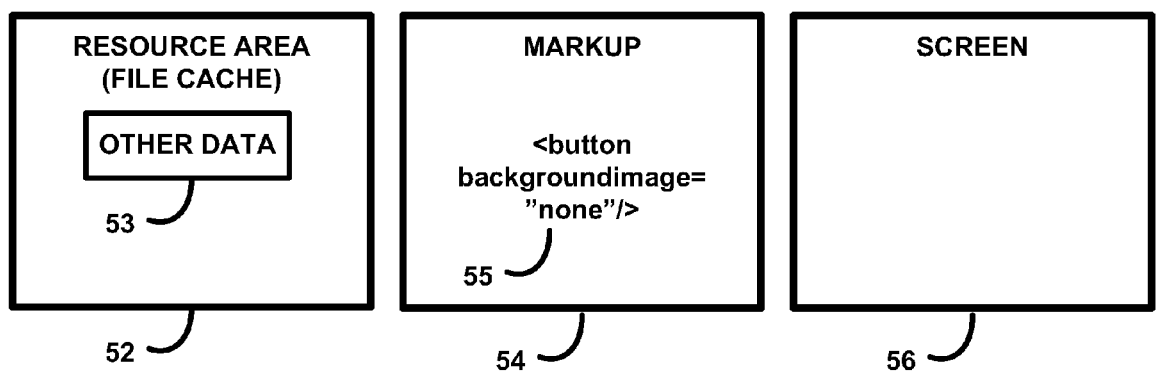
FIG. 3 shows an exemplary initial state of the arrangement.

FIG. 3 illustrates an exemplary initial state of the arrangement pertaining to advanced content. In this figure, a resource area 52 is indicated which (in the example) holds certain data 53. It is noted that while the resource area 52 is shown as pertaining to a file cache, other types of data storage may be employed as are known.

FIG. 3 also illustrates a markup element 54. The markup element 54 represents a set of codes in a text file that instruct the computing device how to format a file on a printer or display or how to index and link its contents. An exemplary markup code 55 is indicated, <button backgroundimage="none"/>. This exemplary markup code 55 generally instructs a screen or display 56 to render a blank screen, as no downloaded resources are being used at this stage.

Figure 4:
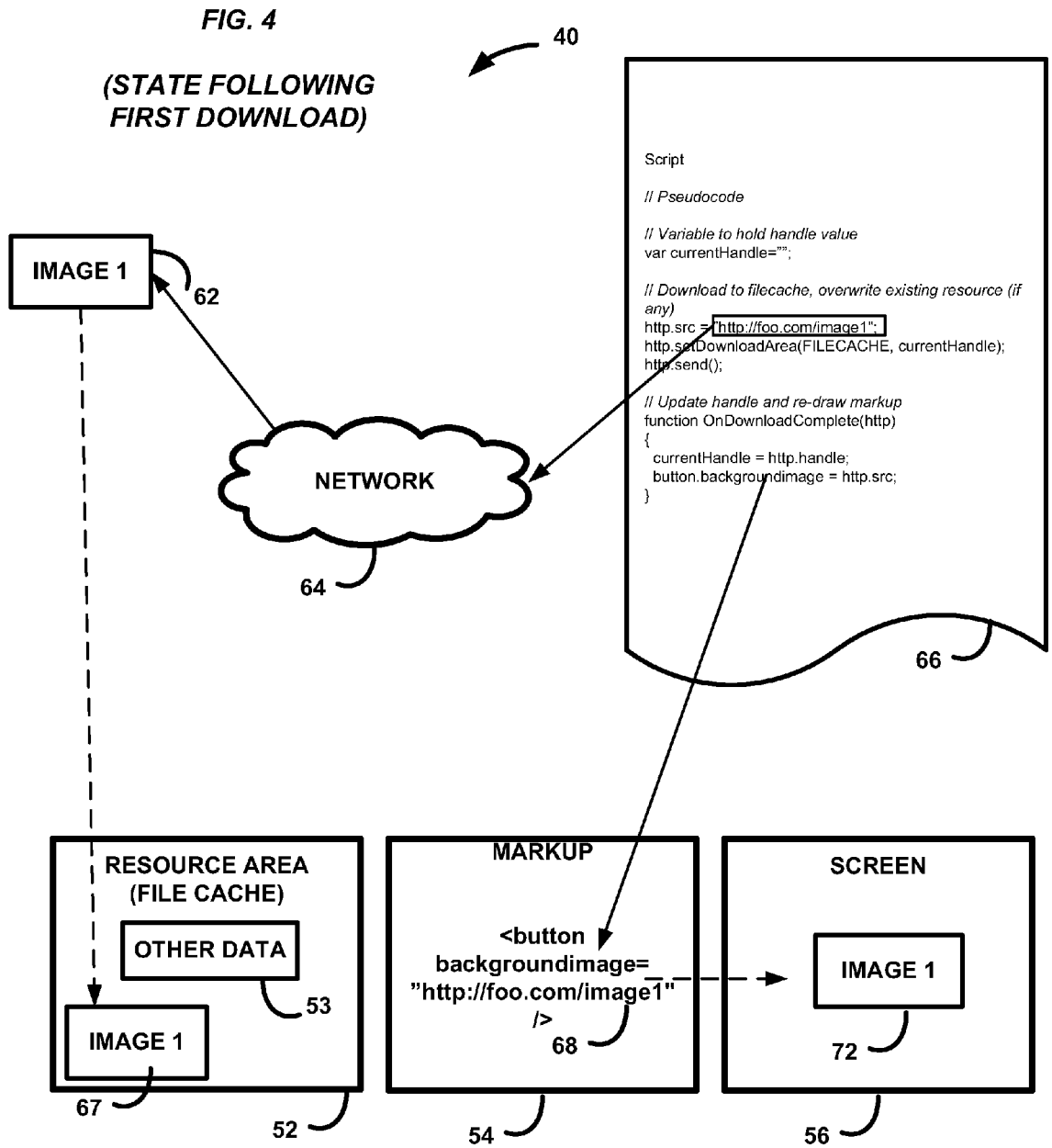
FIG. 4 shows an exemplary state of the arrangement after a first download.

FIG. 4 shows an arrangement 40 in which a first download has been completed. The script has requested http://foo.com/ image1 to be downloaded to file cache. The "image 1" 62 has been requested and the same is downloaded from a network 64, which may be the internet. It is noted that the script does not have a file name for the resource, in the file cache, but the same does possess the handle.

The "image 1" occupies a download location 67 in the resource area 52. Markup 68 for the display of "image 1" is shown in the markup module 54, and a rendered "image 1" 72 is displayed on the screen 56.

Pseudocode script for the above is illustrated as code 66 in FIG. 4. In particular, the code implements a variable to hold the current handle. The code then shows the http.src which points to the URI of the desired "image 1". The code then progresses to download the resource, in this case to file cache. The handle is then assigned, and the resource, in this case the image, is rendered.

Figure 5:
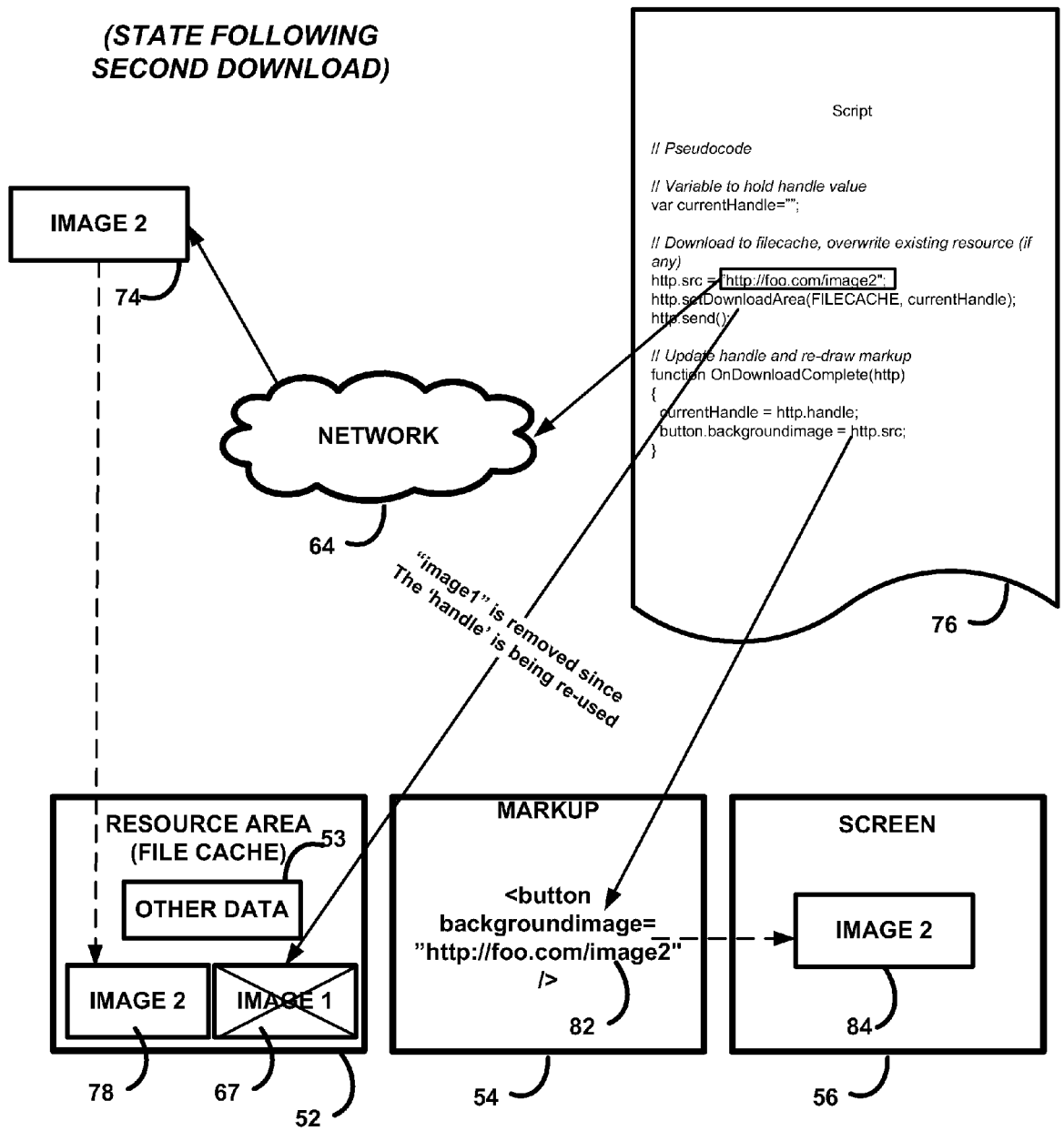
FIG. 5 shows an exemplary state of the arrangement after a second download.

FIG. 5 shows an arrangement 50 which represents the arrangement 40 at a later point in time. In particular, following the download of a second resource. In this case, an "image 2" 74 has been requested and the same is downloaded from the network 64.

In FIG. 5, the script has requested http://foo.com/image2 to be downloaded to file cache. The "image 2" 74 has been requested and the same is downloaded from a network 64, which may be the internet. The image replaces the old image in the file cache, as the same is no longer needed.

The "image 2" occupies a download location 78 in the resource area 52. In some implementations, especially for space-constrained devices, the "image 2" replaces the previously-downloaded "image 1". The arrangement knows to delete or otherwise remove "Image 1" because the same monitors the handle. The handle may be re-used or a new handle returned.

Markup 82 for the display of "image 2" is shown in the markup module 54, and a rendered "image 2" 84 is displayed on the screen 56.

Pseudocode script for the above is illustrated as code 76 in FIG. 5. As in FIG. 4, the code implements a variable to hold the current handle. The code then shows the http.src which points to the URI of the desired "image 2". The code then progresses to download the resource, in this case to file cache. The handle is then assigned, and the resource, in this case the image, is rendered.

The above description provides an arrangement for API downloading resources for advanced content. Variations may also be apparent. For example, while the arrangement has been primarily described in the context of caches and protected storage, the arrangement may apply to any time of file storage. While certain of the figures have focused on image files, the arrangement may apply to any type of advanced content media file.

Figure 6:
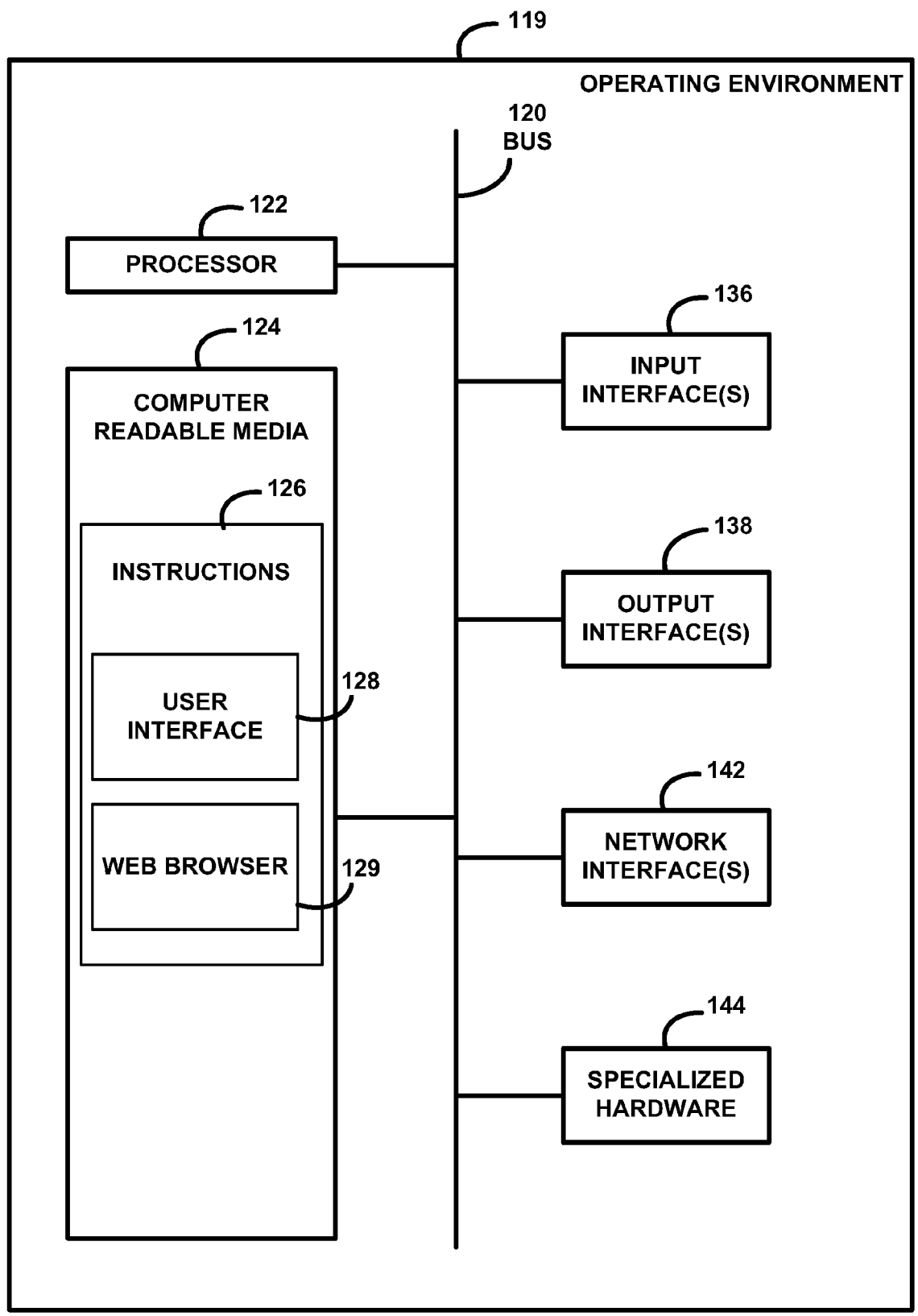
FIG. 6 is a simplified functional block diagram of an exemplary configuration of an operating environment in which the arrangement for anonymous API downloaded resources for advanced content may be implemented or used.

FIG. 6 is a block diagram of an exemplary configuration of an operating environment 119 (such as a client-side device or application or a networked server or service) in which all or part of the arrangement shown and discussed in connection with the figures may be implemented or used. Operating environment 119 is generally indicative of a wide variety of general-purpose or special-purpose computing environments, and is not intended to suggest any limitation as to the scope of use or functionality of the arrangements described herein.

As shown, operating environment 119 includes processor 122, computer-readable media 124, and computer-executable instructions 126. One or more internal buses 120 may be used to carry data, addresses, control signals, and other information within, to, or from operating environment 119 or elements thereof.

Processor 122, which may be a real or a virtual processor, controls functions of the operating environment by executing computer-executable instructions 126. The processor may execute instructions at the assembly, compiled, or machine-level to perform a particular process.

Computer-readable media 124 may represent any number and combination of local or remote devices, in any form, now known or later developed, capable of recording, storing, or transmitting computer-readable data, such as the above-noted computer-executable instructions 126, including user interface 128 and web browser 129, the latter of which may include HTTP client object 15. Of course, the HTTP client object 15 may also be implemented in a number of other ways.

The computer-readable media 124 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 124 represent any signal processing methods or stored instructions. Generally, computer-executable instructions 126 are implemented as software components according to well-known practices for component-based software development, and are encoded in computer-readable media. Computer programs may be combined or distributed in various ways. Computer-executable instructions 126, however, are not limited to implementation by any specific embodiments of computer programs, and in other instances may be implemented by, or executed in, hardware, software, firmware, or any combination thereof.

Input interface(s) 136 are any now-known or later-developed physical or logical elements that facilitate receipt of input to operating environment 119.

Output interface(s) 138 are any now-known or later-developed physical or logical elements that facilitate provisioning of output from operating environment 119. Network interface(s) 142 represent one or more physical or logical elements, such as connectivity devices or computer-executable instructions, which enable communication between operating environment 119 and external devices or services, via one or more protocols or techniques. Such communication may be, but is not necessarily, client-server type communication or peer-to-peer communication. Information received at a given network interface may traverse one or more layers of a communication protocol stack.

Specialized hardware 144 represents any hardware or firmware that implements functions of operating environment 119. Examples of specialized hardware include encoders/decoders, decrypters, application-specific integrated circuits, clocks, and the like.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways. Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A computer-implemented method of downloading resources and managing downloaded resources, the method comprising:

using a Hypertext Transfer Protocol (HTTP) client on a computing device to employ one or more application program interfaces (APIs) for requesting a file to be downloaded from an HTTP server, the one or more APIs configured to:

request the file using an original Uniform Resource Identifier (URI) of the file, specify a storage location on the computing device to which the file is to be downloaded, retrieve a current handle assigned to a prior downloaded file to be replaced in the storage location on the computing device, remove the prior downloaded filed from the storage location on the computing device using the current handle, and download the file to the storage location on the computing device;

assigning the current handle to the downloaded file to enable the downloaded file to be called using the current handle instead of using a local URI for the downloaded file associated with the storage location on the computing device;

associating the current handle with the original URI of the file in a look-up table to enable the downloaded file to be called using the original URI of the file;

performing an operation upon the downloaded file according to a command of an advanced content playlist by calling the downloaded file using the current handle associated with the original URI of the file or using the original URI of the file; and removing the downloaded file from the storage location on the computing device using the current handle according to an automatic removal operation.

2. The method of claim 1, further comprising:

determining whether the file is to be downloaded to a file cache on the computing device or in a protected storage location on the computing device.

3. The method of claim 2, wherein the file is downloaded to the protected storage location without providing the downloaded file with an explicit file name that specifies the protected storage location.

4. The method of claim 2, wherein the file is downloaded to the file cache on the computing device without providing the downloaded file with an explicit file name that specifies the file cache.

5. The method of claim 1, wherein the automatic removal operation comprises:

removing the downloaded file from the storage location on the computing device upon quitting or restarting of an application that is running the advanced content playlist.

6. The method of claim 1, wherein the automatic removal operation comprises:

removing the downloaded file from the storage location on the computing device upon requesting and downloading a new file to be downloaded to the storage location on the computing device.

7. The method of claim 1, wherein the computing device is a mobile phone executing an advanced content application program.

8. A computing device comprising:

a processor for executing computer-executable instructions; and memory storing computer-executable instructions including a set of application program interfaces (APIs) for execution on the computer in conjunction with an advanced content application program that downloads and manages files, the set of APIs comprising:

one or more APIs configured to send a request to a Hypertext Transfer Protocol (HTTP) server for a file to be downloaded using an original Uniform Resource Identifier (URI) of the file;

one or more APIs configured to specify a storage location on the computing device to which the file is to be downloaded, retrieve a current handle assigned to a prior downloaded file to be replaced in the storage location on the computing device, remove the prior downloaded filed from the storage location on the computing device using the current handle, and download the file to the storage location on the computing device;

one or more APIs configured to assign the current handle to the downloaded file to enable the downloaded file to be called using the current handle instead of using a local URI for the downloaded file associated with the storage location on the computing device;

one or more APIs configured to associate the current handle with the original URI of the file in a look-up table to enable the downloaded file to be called using the original URI of the file; and one or more APIs configured to remove the downloaded file from the storage location on the computing device using the current according to an automatic removal operation, wherein the advanced content application program can perform an operation upon the downloaded file according to a command of an advanced content playlist by calling the downloaded file using the current handle associated with the original URI of the file or using the original URI of the file.

9. The computing device of claim 8, wherein the automatic removal operation comprises:

removing the downloaded file from the storage location on the computing device upon the request and download of a new file to be downloaded to the storage location on the computing device.

10. The computing device of claim 8, wherein the file is downloaded to the storage location without providing an explicit file name that specifies a destination path to the downloaded file.

11. The computing device of claim 8, wherein the file is downloaded to a protected storage location on the computing device without providing the downloaded file with an explicit file name that specifies the protected storage location.

12. The computing device of claim 8, wherein the file is downloaded to a file cache on the computing device without providing the downloaded file with an explicit file name that specifies the file cache.

13. The computing device of claim 8, wherein the automatic removal operation comprises:

removing the downloaded file from the storage location on the computing device upon quitting or restarting of the advanced content application program.

14. The computing device of claim 8, wherein the computing device is a mobile phone executing the advanced content application program.

15. A computer-readable medium that does not consist of a signal, the computer-readable medium storing computer-executable instructions that, when processed by a computing device, cause the computing device to perform a method of downloading files and managing downloaded files, the method comprising:

using a Hypertext Transfer Protocol (HTTP) client on the computing device to employ one or more application program interfaces (APIs) for requesting a file to be downloaded from an HTTP server, the one or more APIs configured to:

request the file using an original Uniform Resource Identifier (URI) of the file, specify a storage location on the computing device to which the file is to be downloaded, retrieve a current handle assigned to a prior downloaded file to be replaced in the storage location on the computing device, remove the prior downloaded filed from the storage location on the computing device using the current handle, and download the file to the storage location on the computing device;

assigning the current handle to the downloaded file to enable the downloaded file to be called using the current handle instead of using a local URI for the downloaded file associated with the storage location on the computing device;

associating the current handle with the original URI of the file in a look-up table to enable the downloaded file to be called using the original URI of the file;

performing an operation upon the downloaded file according to a command of an advanced content playlist by calling the downloaded file using the current handle associated with the original URI of the file or using the original URI of the file; and removing the downloaded file from the storage location on the computing device using the current handle according to an automatic removal operation.

16. The computer-readable medium of claim 15, wherein the automatic removal operation comprises:

removing the downloaded file from the storage location on the computing device when an application that is running the advanced content playlist quits or restarts.

17. The computer-readable medium of claim 15, wherein the file is downloaded to a protected storage location on the computing device without providing the downloaded file with an explicit file name that specifies the protected storage location.

18. The computer-readable medium of claim 15, wherein the file is downloaded to a file cache on the computing device without providing the downloaded file with an explicit file name that specifies the file cache.

19. The computer-readable medium of claim 15, wherein the automatic removal operation comprises:

removing the downloaded file from the storage location on the computing device upon requesting and downloading a new file to be downloaded to the storage location on the computing device.

20. The computer-readable medium of claim 15, wherein the computing device is a mobile phone executing an advanced content application program.

* * * * *